June 21, 1938.  D. J. CAMPBELL  2,121,015
INTERNAL COMBUSTION ENGINE COOLING SYSTEM
Filed May 9, 1936  2 Sheets-Sheet 2

Inventor
Donald J. Campbell
Attorneys.

Patented June 21, 1938

2,121,015

UNITED STATES PATENT OFFICE 2,121,015

INTERNAL COMBUSTION ENGINE COOLING SYSTEM

Donald J. Campbell, Muskegon Heights, Mich.

Application May 9, 1936, Serial No. 78,779

10 Claims. (Cl. 123—173)

My invention relates to cooling systems for internal combustion engines and has for one object to provide a new and improved cooling system for internal combustion engines which will cool the various parts of the cylinder at differential rates in consonance with the rate at which heat is generated in the various parts of the cylinder so as to maintain proper controlled cooling throughout the various parts of the cylinder.

Another object of my invention is to make use of the heat generated in the internal combustion engine cylinder in such a manner as to extract from the cylinder the maximum amount of heat which can be extracted without interfering with the combustion cycle.

Another object of my invention is to use the heat of an internal combustion engine to vaporize a cooling liquid.

Other objects will appear from time to time throughout the specification and claims.

My invention is illustrated more or less diagrammatically in the accompanying drawings wherein—

Figure 1:
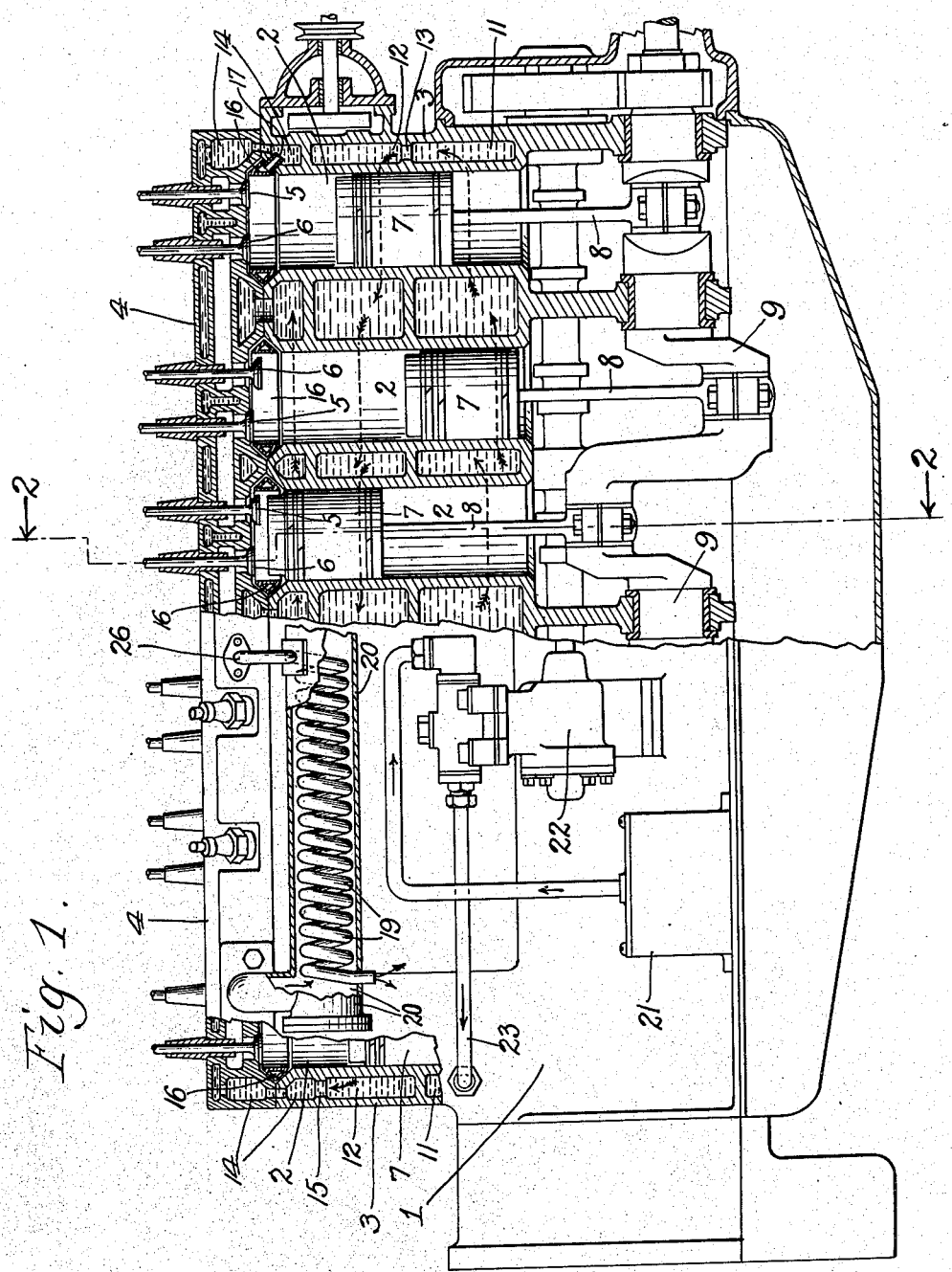
Figure 1 is a side elevation of an engine with parts in section.
Figure 2:
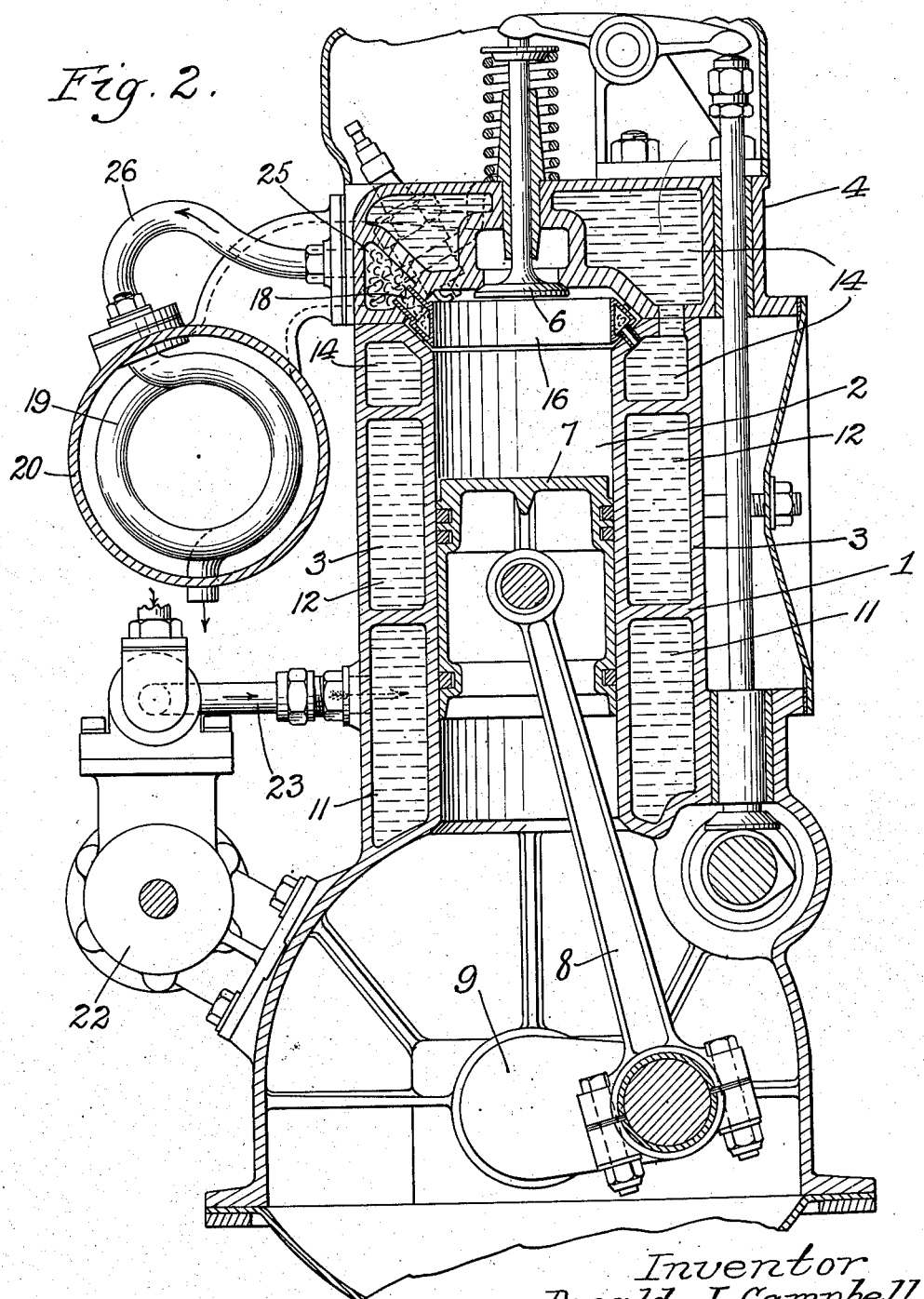
Figure 2 is a section along the line 2—2 of Figure 1.

1 is an internal combustion engine cylinder block comprising cylinders 2, jacket 3 and cylinder head 4. 5, 6, are the intake and exhaust valves, 7 is the piston, 8 the connecting rod and 9 the crank shaft. The jacket is divided up into a plurality of separate fluid containing zones, the lower zone 11 around the lower part of the cylinder at the downward excursion of the piston is adapted to receive relatively cool liquid and serve as a preheating zone wherein liquid will absorb heat from the cooler part of the internal combustion engine cylinder. 12 is an intermediate zone connected to the lower zone at one end of the engine by means of the conduits 13. 14 is a vaporizing zone encircling the cylinder head, connected to the intermediate zone 12, by conduits 15 at a point far removed from the conduits 13. 16 are a series of superheating coils located within the upper end of the engine cylinder. They receive vapor or steam from the vaporizer zone from the conduit 17 and discharge it through conduits 18 to the chamber 25 and thence by the conduit 26 to the final superheating coils 19 located in the exhaust manifold 20.

21 is a liquid supply, 22 a pump discharging liquid from the supply through conduits 23, to the preheating zone whereby constantly renewed supply of cooling liquid is continuously forced into the cooling system to replace the vaporized liquid discharged from the superheater.

The result of this arrangement is that the lower end of the piston stroke where it is unnecessary to have a high degree of heat in the engine is cooled by the body of liquid undergoing preheating. This part of the cylinder is never swept by the flame of combustion. The intermediate zone is cooled by the body of liquid undergoing intermediate heat, part of this zone being swept by the flame of combustion toward the end of the stroke and the upper vaporizing zone encircling as it does the cylinder head and the upper end of the cylinder is subjected to the hot products of combustion at the hottest part of the cycle. The initial superheating coil in the engine cylinder is encircled by the products of combustion but is relatively short so that the vapor or steam is subjected to this intense heat for but a short length of time and the final preheating takes place in the preheating coils in the exhaust manifold, thereby reducing the temperature of the exhaust manifold and reducing the pressure at which the engine exhausts into the atmosphere. The relatively small initial superheating coil in the combustion chamber itself is so small that it does not materially interfere with the combustion cycle. Thus there is a controlled and even heat flow from the engine cylinder.

I claim:

1. An internal combustion engine comprising a cylinder, intake and exhaust valves, a fuel supply, an exhaust manifold, ignition means, a piston, a crank shaft and a connecting rod, a low temperature cooling chamber surrounding the crank end of the cylinder, an intermediate cooling chamber surrounding the central portion of the cylinder, a high temperature vaporizing chamber surrounding the cylinder head, and a coil contained within the cylinder adjacent the upper end thereof and out of contact with the walls thereof, conduits connecting said chambers and coil in series in the order named and means for supplying fluid under pressure to the low temperature cooling chamber.

2. An internal combustion engine comprising a cylinder, intake and exhaust valves, a fuel supply, an exhaust manifold, ignition means, a piston, a crank shaft and a connecting rod, a low temperature cooling chamber surrounding the crank end of the cylinder, an intermediate cooling chamber surrounding the central portion of the cylinder, a high temperature vaporizing chamber surrounding the cylinder head, a coil within the exhaust manifold, conduits connecting said chambers in series in the order named and means for supplying cooling fluid under pressure to the low temperature cooling chamber.

3. An internal combustion engine comprising a cylinder, intake and exhaust valves, a fuel supply, an exhaust manifold, ignition means, a piston, a crank shaft and a connecting rod, a low temperature cooling chamber surrounding the crank end of the cylinder, an intermediate cooling chamber surrounding the central portion of the cylinder, a high temperature vaporizing chamber surrounding the cylinder head, and a coil contained within the cylinder adjacent the upper end thereof and out of contact with the walls thereof, a cooling coil within the exhaust manifold, conduits connecting said chambers and coil in series in the order named and means for supplying fluid under pressure to the low temperature cooling chamber.

4. An internal combustion engine comprising a cylinder, intake and exhaust valves, a fuel supply, an exhaust manifold, ignition means, a piston, a crank shaft and a connecting rod, a low temperature cooling chamber surrounding the crank end of the cylinder, an intermediate cooling chamber surrounding the central portion of the cylinder, a high temperature vaporizing chamber surrounding the cylinder head adjacent the upper end thereof, a coil contained within the cylinder adjacent the upper end thereof and out of contact with the walls thereof, conduits connecting said chambers and coil in series in the order named and means for supplying fluid under pressure to the low temperature cooling chamber.

5. An internal combustion engine comprising a cylinder, intake and exhaust valves, a fuel supply, an exhaust manifold, ignition means, a piston, a crank shaft and a connecting rod, a low temperature cooling chamber surrounding the crank end of the cylinder, an intermediate cooling chamber surrounding the central portion of the cylinder, a high temperature vaporizing chamber surrounding the cylinder head, and a coil contained within the cylinder adjacent the upper end thereof and out of contact with the walls thereof, a cooling coil within the exhaust manifold, conduits connecting said chambers and coil in series in the order named and means for supplying fluid under pressure to the low temperature cooling chamber, the fluid supply means comprising a pump, a reservoir from which the pump draws cooling fluid to be supplied to the cooling chamber, and means for operating the pump in consonance with the engine operation.

6. Means for cooling an internal combustion engine cylinder comprising a fluid containing jacket surrounding the cylinder, a plurality of partitions dividing the jacket into a plurality of serially connected chambers, one chamber surrounding the crank end of the cylinder, a second chamber surrounding an intermediate part of the cylinder and a third chamber surrounding the head of the cylinder, a coil in the cylinder in communication with said chamber and out of contact with the cylinder walls.

7. Means for cooling an internal combustion engine cylinder comprising a fluid containing jacket surrounding the cylinder, a plurality of partitions dividing the jacket into a plurality of serially connected chambers, one chamber surrounding the crank end of the cylinder, a second chamber surrounding an intermediate part of the cylinder and a third chamber surrounding the head of the cylinder, a cooling coil in the exhaust manifold.

8. Means for cooling an internal combustion engine cylinder comprising a fluid containing jacket surrounding the cylinder, a plurality of partitions dividing the jacket into a plurality of serially connected chambers, one chamber surrounding the crank end of the cylinder, a second chamber surrounding an intermediate part of the cylinder and a third chamber surrounding the head of the cylinder, a cooling coil in the cylinder in communication with said chamber, a cooling coil in the exhaust manifold.

9. An internal combustion engine including in a single engine block a plurality of cylinders, intake and exhaust valves, an exhaust manifold, crank shaft, pistons and connecting rods for each cylinder, three separate cooling chambers within the engine block, one of them a low temperature chamber surrounding the crank ends of the cylinders, the next an intermediate cooling chamber surrounding the central portions of the cylinders, and the third a high temperature vaporizing chamber surrounding the cylinder heads, means for supplying cooling fluid under pressure to the low temperature chamber and circulating it through such chamber about a plurality of cylinders, then discharging it therefrom to the intermediate chamber and there circulating it about a plurality of cylinders, then discharging it to the vaporizing chamber and there circulating the liquid and vapor about a plurality of the cylinders, and means for discharging vaporized liquid from the vaporizing chamber.

10. An internal combustion engine including in a single engine block a plurality of cylinders, intake and exhaust valves, an exhaust manifold, crank shaft, pistons and connecting rods for each cylinder, three separate cooling chambers within the engine block, one of them a low temperature chamber surrounding the crank ends of the cylinders, the next an intermediate cooling chamber surrounding the central portions of the cylinders, and the third a high temperature vaporizing chamber surrounding the cylinder heads, means for supplying cooling fluid under pressure to the low temperature chamber and circulating it through such chamber about a plurality of cylinders, then discharging it therefrom to the intermediate chamber and there circulating it about a plurality of cylinders, then discharging it to the vaporizing chamber and there circulating the liquid and vapor about a plurality of the cylinders, and means for discharging vaporized liquid from the vaporizing chamber, there being closed partitions within the engine block and associated with a plurality of cylinders dividing and separating the cooling chambers, a conduit at a point removed from the place where the cooling fluid is supplied to the low temperature chamber to conduct the fluid to the intermediate chamber, and a conduit at a point removed from the first mentioned conduit to conduct cooling fluid from the intermediate to the vaporizing chamber.

DONALD J. CAMPBELL.